(12) United States Patent
Pérez

(10) Patent No.: US 8,491,117 B2
(45) Date of Patent: Jul. 23, 2013

(54) ARMLESS SPECTACLES

(76) Inventor: Jesús Garcia Pérez, Barcelona (ES)

( * ) Notice: Subject to any disclaimer, the term of this patent is extended or adjusted under 35 U.S.C. 154(b) by 0 days.

(21) Appl. No.: 13/497,328

(22) PCT Filed: Sep. 21, 2010

(86) PCT No.: PCT/ES2010/070609
§ 371 (c)(1),
(2), (4) Date: Mar. 21, 2012

(87) PCT Pub. No.: WO2011/036324
PCT Pub. Date: Mar. 31, 2011

(65) Prior Publication Data
US 2012/0218506 A1   Aug. 30, 2012

(30) Foreign Application Priority Data
Sep. 22, 2009   (ES) .................................. 200930714

(51) Int. Cl.
*G02C 1/00*   (2006.01)
*G02C 5/12*   (2006.01)

(52) U.S. Cl.
CPC . *G02C 5/12* (2013.01); *G02C 5/128* (2013.01)
USPC .................. 351/65; 351/68; 351/79; 351/126

(58) Field of Classification Search
CPC .................................. G02C 5/12; G02C 5/128
USPC ......................................... 351/41, 65–79, 126
See application file for complete search history.

(56) References Cited

U.S. PATENT DOCUMENTS

| 1,029,241 | A | * | 6/1912 | Snyder | .............................. 2/446 |
| 1,914,971 | A | | 6/1933 | Ferris | |
| 5,015,087 | A | | 5/1991 | Baratelli | |
| 5,661,536 | A | | 8/1997 | Conway | |
| 6,082,857 | A | * | 7/2000 | Lockhart | ....................... 351/178 |
| 2004/0256249 | A1 | | 12/2004 | Sarif | |

OTHER PUBLICATIONS

International Search Report for corresponding patent application No. PCT/ES2010/070609 dated Mar. 2, 2011.

* cited by examiner

*Primary Examiner* — Huy K Mai
(74) *Attorney, Agent, or Firm* — Renner, Otto, Boisselle & Sklar, LLP

(57) ABSTRACT

The present invention describes spectacles of the type that remain securely in place without the need for a frame that has arms, providing the corresponding optical features required in each case and being able to be formed by a single, continuous element in the preferred embodiment thereof, or by a number of pieces, the securing thereof being achieved by means of a system for adaptation to the users anatomy based on the clip effect.

8 Claims, 5 Drawing Sheets

ARMLESS SPECTACLES

The present patent application consists, according to its title, in spectacles of the type known as being without arms, with the possibility to be obtained from one single piece of material, providing numerous advantages such as will be detailed in the present specification.

TECHNICAL FIELD

More specifically, the invention relates to spectacles of the type which remain securely in place without the need for a frame that has arms, providing the corresponding optical features required in each case.

The mission of the present invention is having in one spectacles the advantages of being suitable to be manufactured in a simple fashion from one single piece, not requiring arms, and having the suitable optical features for every need, minimising the costs of manufacture and maximising the versatility of the design.

BACKGROUND ART

The spectacles free of a frame without arms that have been used up to day and that are called colloquially pince-nez, nose spectacles and Oxford spectacles among others, have been manufactured mainly from the different materials constituting the required elements: optics, frame, supports, bridge, spring, and so forth.

One of the main types of armless spectacles, called spring in "C", is based on the fixing of the system by some supports which are supportive to the bridge acting as spring and links the two optics, as indicated in the U.S. Pat. No. 205,860. This type of spectacles has the inconvenient that the optics swing differently according to the different thicknesses of each nose, changing thus the relative positions and, thus their optical properties.

In another of the types of spectacles called stiff bridge, the mentioned inconvenient is solved by a non flexible bridge and the pressure for fixing the plates to the nose is achieved by joints and springs more complicated to manufacture which may be seen in FIG. 4 of the U.S. Pat. No. 1,167,953.

Therefore, the need exits to provide for spectacles that may be manufactured in an efficient way, with easy operations and low costs, having a fixing system that allows for safety in using the same, adaptability to the different anatomic features and that gives great versatility for the different applications in which to use them.

DESCRIPTION OF THE INVENTION

The spectacles described in the present invention comprise essentially a material sheet with the corresponding optical properties required for the application to which it is assigned and comprise in its preferred embodiment one single continuous element, thus being suitable to be manufactured through the common systems of production, making cheaper said manufacturing process and its related costs, purchase of starting materials, assembly, and so forth.

Said spectacles are formed by one single piece and have various parts with specific properties characterising the invention, as are the area destined to accommodate the optical properties, and the plates that shall exercise as linking element with the user.

The areas destined to accommodate the optical properties will be formed in its preferred embodiment by a plastic material sheet of a thickness of about 0.2 mm, although different materials and thicknesses may be used that provide optical and structural properties for the designated needs.

In another possible embodiments, said spectacles may be produced from two suitable sheets, obtaining two parts that need only to be linked to obtain the required spectacles to cover the needs of, for example, the vision of three-dimensional stereoscopic images, using supplementary filters separating the vision of each eye, making them independent.

The plates form an adaption system to the anatomy of the user based on the clip effect. This concerns two protuberances which in its preferred embodiment, emerge transversally from the optical properties area towards the face of the user or in opposite sense, towards the exterior, exactly in the inferior part where the two sides of said optics connect, in the centre part of the spectacles.

These plates, due to their features, provide for a flexibility in the link between the optical properties area and said plates, giving the required pressure for the fixing. The bridge does not deform upwardly, thus a totally integrated pince-nez design is obtained preserving the geometry of the whole while adapting to different anatomic features.

Since the plates exercise an action on the nose, they also exercise an equivalent reaction force on both halves of the spectacles that tends to deform them forwardly. The material being used for its realisation may be operated to limit the deformation produced by the strain exercised by the plates, by being able to realise various geometries being resistant to said deformation, through processes like heat shaping, pressing, bending, moulding or superposition which assure the required resistance and formal stability. Likewise, it might also be possible to take advantage for this of the resistance that might offer an anisotropic material to be deformed in a determined sense.

The design allows optionally the inclusion of some projections or tabs in the spectacles that facilitate the pincer function of the plates. These tabs are formed such that they receive the pressure from the fingers and act on the plates to open them. When the pressure from the fingers is released after having placed the spectacles, this torsional force is freed and makes that the plates press on the nose.

In another possible embodiment, the fixing force is exercised by a spring in "C" being semi independent from the frame. This serves now as a pivot around which the mobile elements swing in a transversal plane to it separating to each side a function: behind the clip and the spring in front. By pushing this front spring with two fingers the plates are opened from the interior part to place and remove the spectacles.

In the case that the user who already used refracting glasses required further another optical element such as, for example, a filter, he could use spectacles made according to this invention placing them before the glasses. The fixing of these spectacles might be realised in this case, further to the plates own pressure, by the ability that these may remain located below of the supports of the glasses and take advantage of the weight of these latter against the nose of the user.

In this way, the design of this invention allows that advantageous features are established with respect to the current designs like:

The required element due to its optical properties may constitute all what is required: optics, frame, plate, spring and rotation axis of that.
   Savings in the manufacture until being able to consider one single use.
   Production simplicity as there are no mechanisms.
   Fast adaptability to different designs and anatomies.

Fixing system by "clip" of higher security and versatility of the possible uses.

Ease of recycling since one single material is used.

Presence of one continuous surface where to introduce messages or marks.

Other details and features will become manifest in the course of the description given in the following, wherein reference is made to the figures accompanying this specification, wherein for illustrative, but not limiting, purposes embodiments of the invention are shown, without them being the only possible ones.

PREFERRED EMBODIMENT OF THE INVENTION

Now follows a numbered list of the different portions of the invention that may be seen in the annexed figures: (10) spectacles, (11) optical properties area, (12) plates, (13) bridge, (14), linking and joint area of the plates (12) with the optical properties area (11), (15-16) independent filters, (17) tabs, (18) joint point of the bridge (13), (19) exterior spring, (20) folding lines, (21) cleaving line, (22) torsion area, (23) area for mark, event or sign.

Figure 1A:
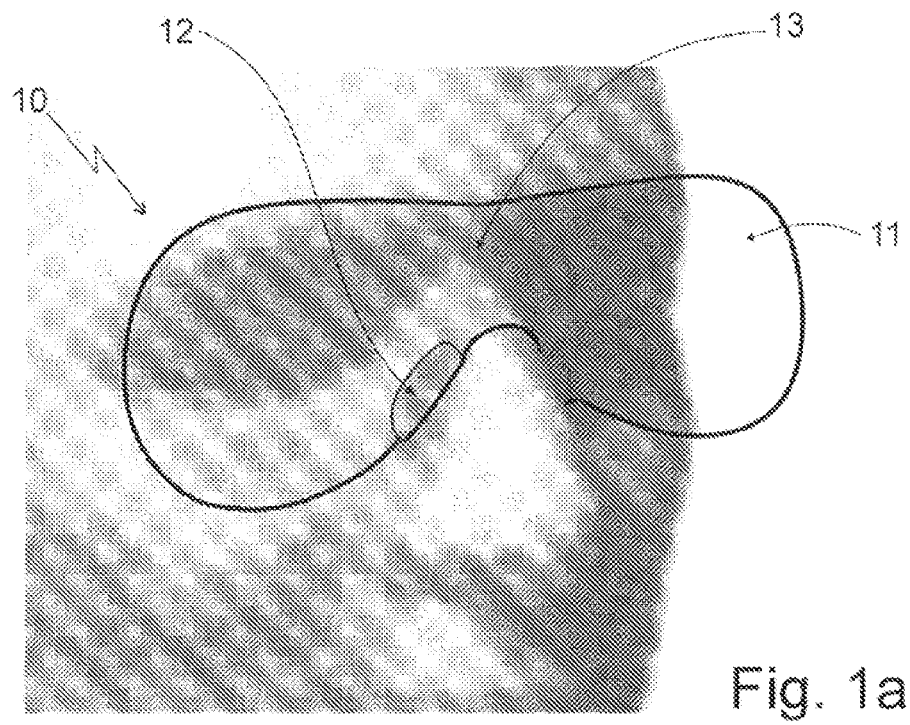
FIGS. 1a and 1b represent perspective views of the preferred embodiments of the invention.
Figure 1B:
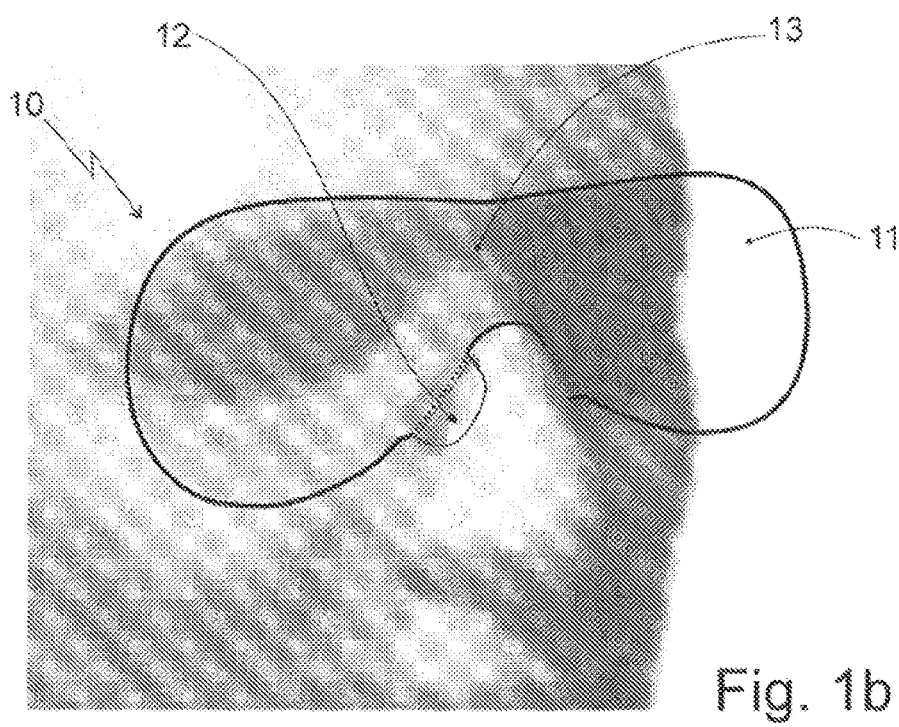
Figure 2:
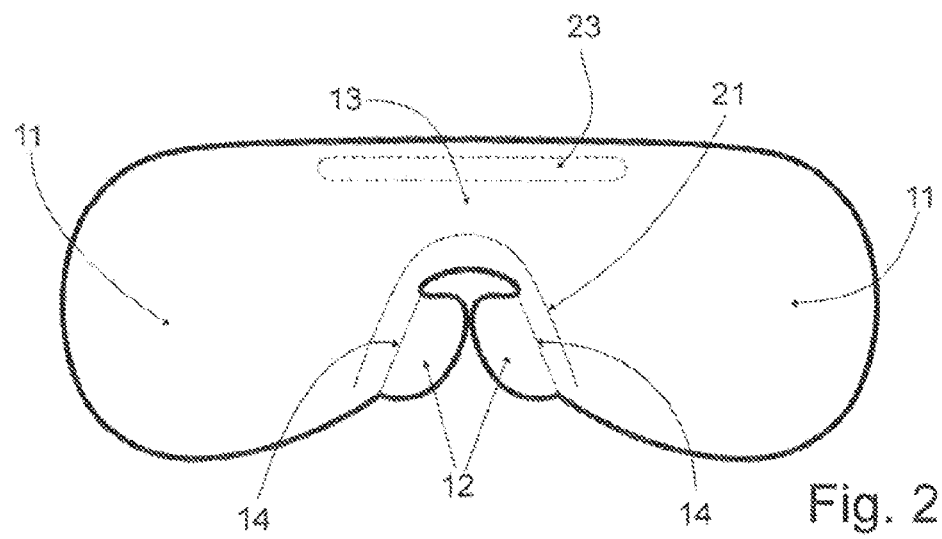
FIGS. 2 and 3 represent front views of the preferred embodiment of the invention.
Figure 3:
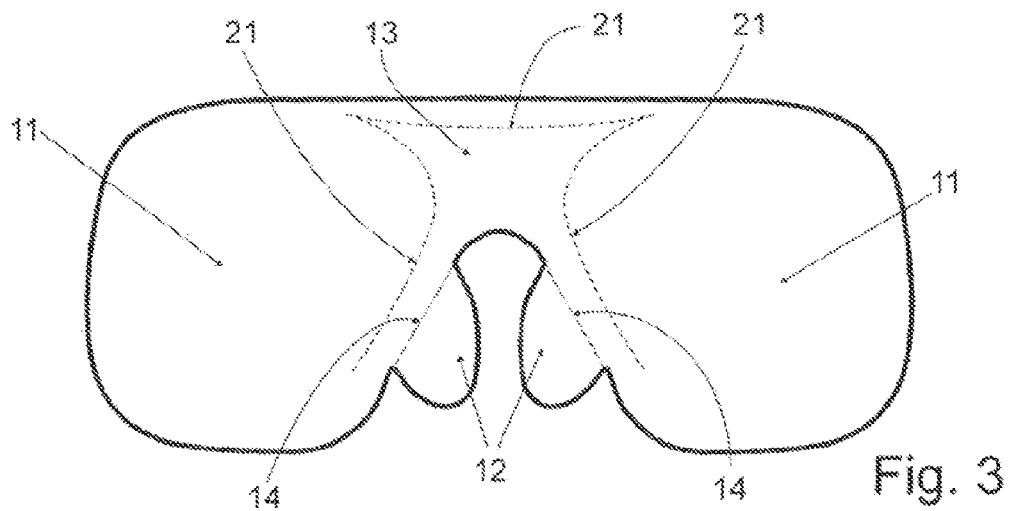

As may be seen in FIGS. 1, 2 and 3, the armless spectacles (10) which are subject of the present invention comprise essentially one sheet of a single material, comprising one or more pieces and forming a compact and continuous element.

The preferred material for this preferred embodiment is a plastic sheet (for example, coloured transparent polyester having a thickness of about 0.2 mm), although different materials may be used providing optical properties for the designated needs.

Said spectacles (10), although being formed from one single piece, provide for various parts having specific properties that compose their advantageous features. One of these parts is the optical properties area (11), that comprises the most of the spectacles (10), distributed on both sides of the bridge (13), corresponding to the vision area of each eye. Said vision area having optical properties may adopt various shapes in its outlines, even presenting inscriptions in a determined area (23) that may constitute the whole surface of the spectacles (10) according to the appearance which is desired to be given to the present invention, without this affecting the remaining advantageous features thereof.

A second part of the spectacles (10) are the plates (12) responsible for exercising the clip effect on the nose of the user, allowing an advantageous fixation with respect to the fixings by support. These plates (12) are in the area of the bridge (13) in its lower part, being placed (12) one on each side of said bridge (13).

The plates (12) represent protuberances that emerge from the indicated area in an approximately transversal plane and remain considerably perpendicular to the optical properties area (11) during its use. These plates (12) may be formed from the same material sheet forming the spectacles (10), and, thanks to the flexibility of the linking area (14) between the plates (12) and the optical properties area (11), the spectacles (10) may be adapted to the width of the nose of the user.

Thus, the plates (12) realise a clip effect allowing the fixing of the spectacles (10) without any other support point on the user and, to not deform the relative angle of the optical elements since the stress of the linking area (14) might bow the assembly (10), this (10) may be operated through common methods such as, for example, heat shaping, pressing, bending, moulding and so forth to limit the deformation that might trigger the force exercised by the plates. One example of this operation would be the folding line (20) that might produce an angle which would stiffen the bridge (13) or the cleaving lines (21) that present the areas which might be deformed by the common methods.

Figure 4:
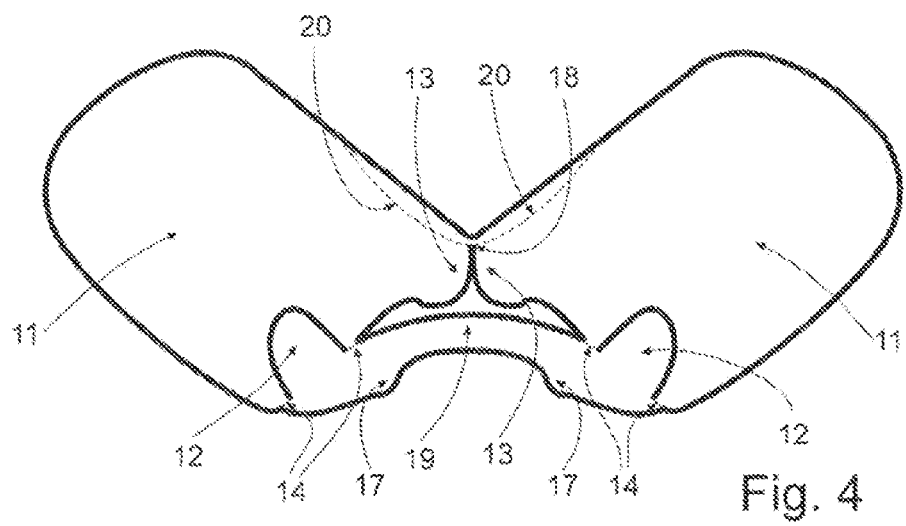
FIG. 4 represents a silhouette of another possible embodiment wherein a possible cutting line is appreciated to be carried out in a plane surface to obtain the spectacles with exterior "C"-form spring.
Figure 5:
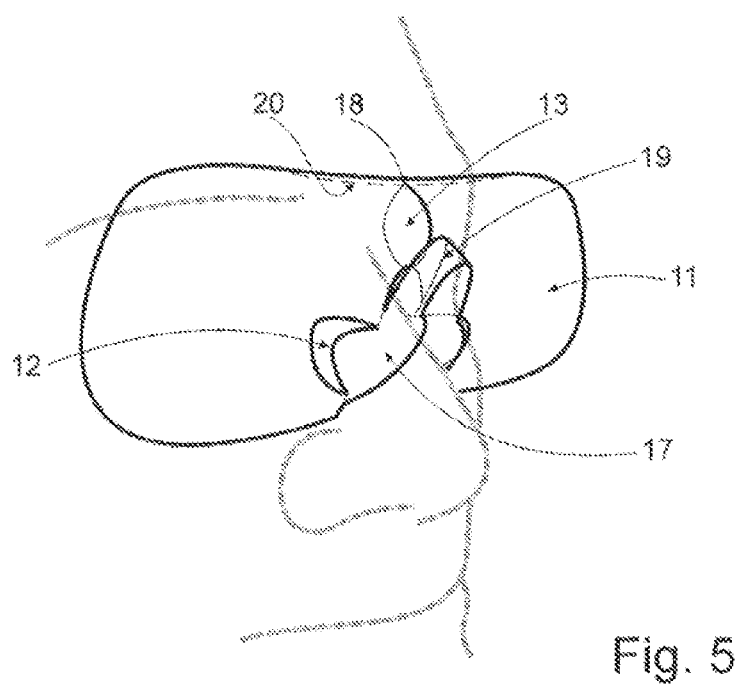
FIG. 5 represents a perspective view of the embodiment of FIG. 4, wherein the assembly of the spectacles and the placing of the same on the user has been realised.

As is one alternative embodiment of the invention, and like it may be observed in FIGS. 4 and 5, the spectacles (10) are formed likewise by one single piece but the distribution of its parts is different, since the pressure of the plates (12) on the nose is effected mostly by a spring in "C" placed outside of the optical plane.

This embodiment starts from a single piece that may be obtained from a flat sheet by a cut as indicated by the silhouette of FIG. 4. In this silhouette, the optical planes (11) are placed in a relative angle which disappears upon rotating them around the connection (18) to align them. The areas of superposition of the bridge (13) set this position by linking them through the common methods (gluing, heat soldering, and so forth) forcing the surface (19) to bend forming an arc (spring in "C").

The force that produces the tendency of this spring (19) to return to its initial flat position intends to separate the projections or tabs (17) that, pivoting around the connections (14) with the optical plane, tend to close the plates (12) on the nose of the user. This embodiment enables a spring (19) able to exercise a huge force or pressure which at the same time is easy to release, pressing the surface of the tabs (17) to place and remove the spectacles (10) comfortably from the nose of the user.

Figure 6:
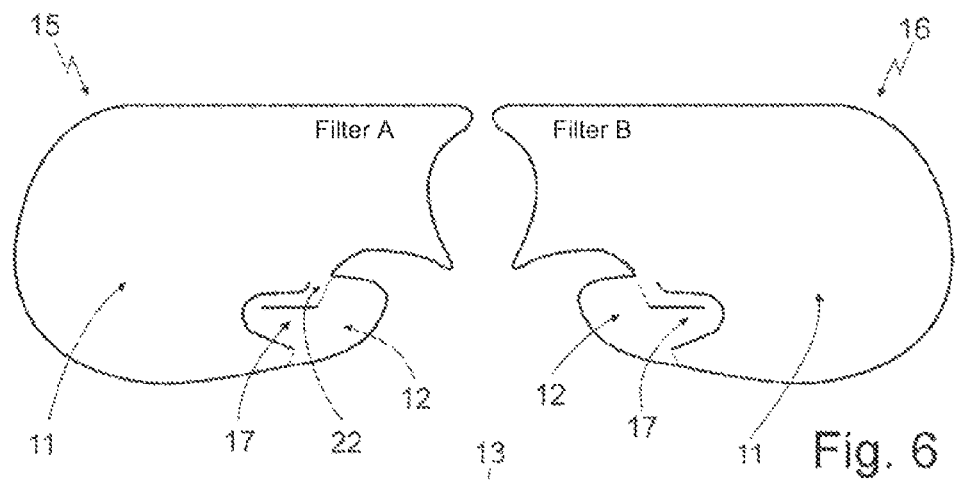
FIG. 6 represents a front view of two independent filters, for another possible embodiment.
Figure 7:
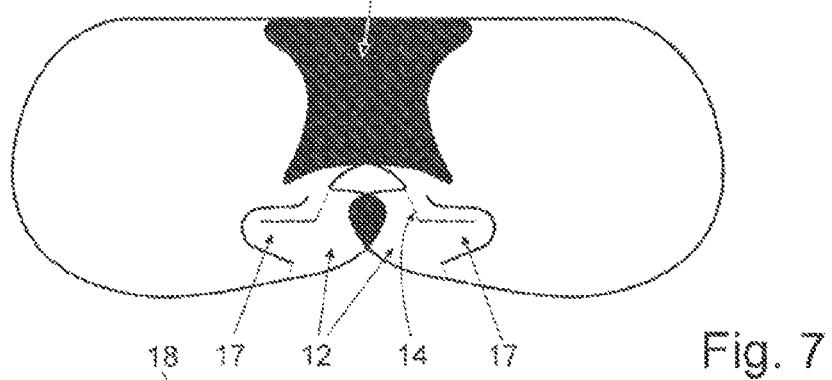
FIG. 7 represents a front view of another possible embodiment after linking the two independent filters, according to FIG. 6.
Figure 8:
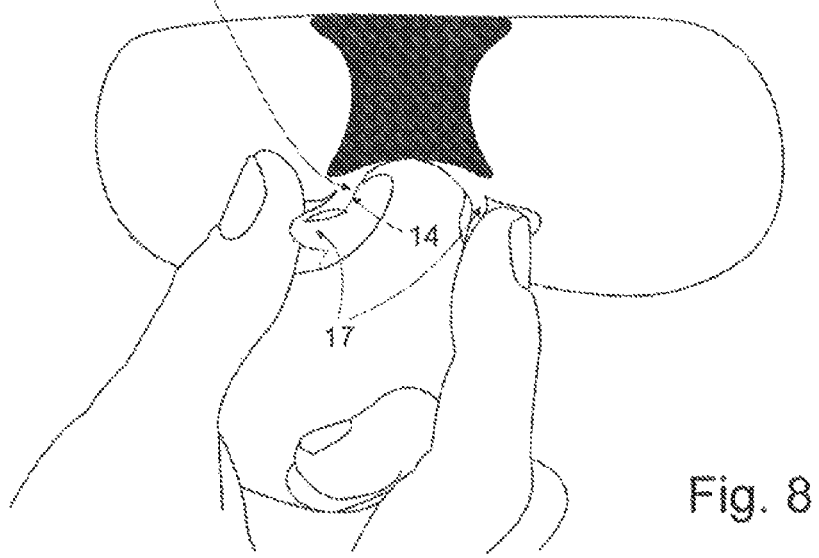
FIG. 8 represents a perspective view of another possible embodiment wherein the user presses the tabs, allowing him to separate the plates for the placing of the spectacles, according to FIGS. 6 and 7.
Figure 9:
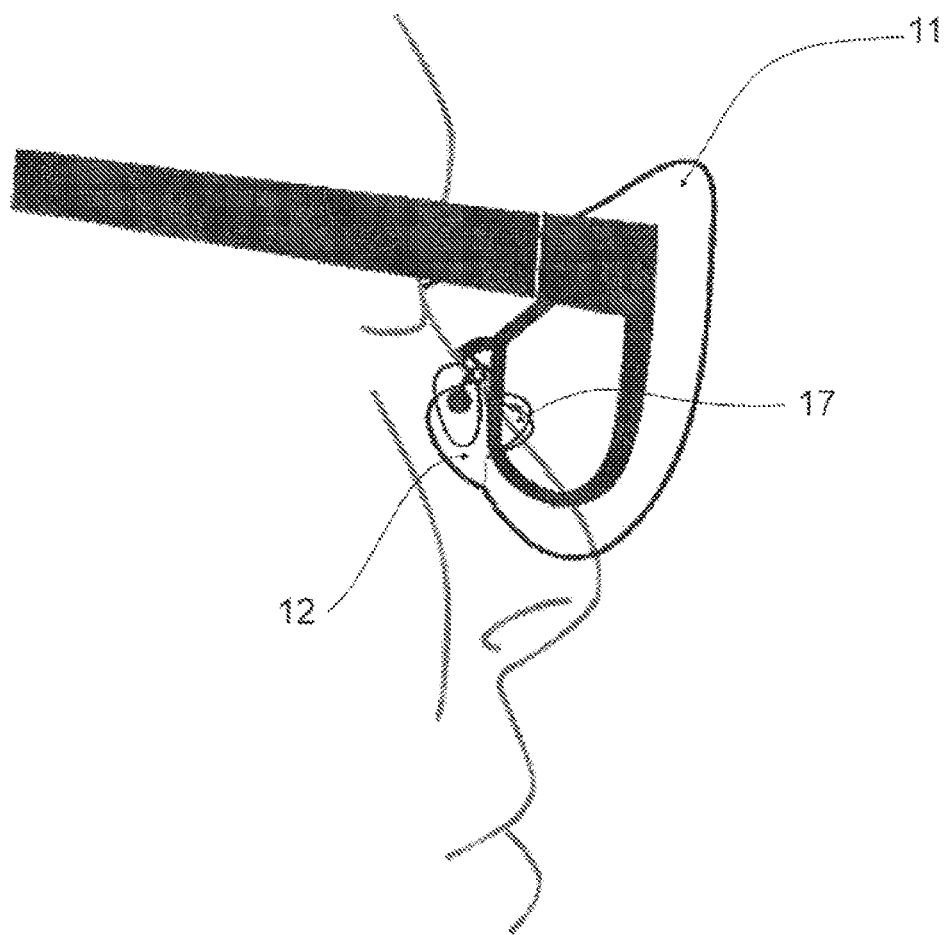
FIG. 9 is a side perspective of an application example of the spectacles subject of the invention, placed on the nose of the user, in front of glasses required by the same, whose plates rest on the plates of the spectacles securing them.

In another alternative embodiment of the invention, and as may be observed in FIGS. 6, 7 and 8, the spectacles (10) are formed from two independent filters (15-16), being this motivated by the need to establish a different filter and supplementary to the other for each eye.

The linking shapes of the two independent filters (15-16) for this embodiment are the common and known ones (assembly, heat soldering, and so forth).

When starting from two independent filters (15-16), plates (12) of bigger size may be obtained, since they may be overlaid in the resting position. The plates (12) may have the aid of projections or tabs (17) like the ones represented to bend the plates (12) and to allow the better placing and removal of the spectacles (10) on the nose of the user.

In this embodiment as well as in others, projections or tabs (17) may be obtained that help the operation of the spectacles (10) to open the plates (12) by pressing with the fingers from the exterior side thereof. These tabs (17) may be formed by cutting the same sheet as indicated in the silhouette of FIG. 6, or by adding a piece of material which is made supportive with the plates (12) with this same function.

In FIG. 8 it may be appreciated how the pressure of the fingers on the tabs opens the plates (12) by overcoming the resistances to the torsion of the area (22) and to the bending of the joints (14). After placing the spectacles (10) into position and the fingers releasing the tabs (17), the tendency of the areas (22) and (14) to return to their original state presses the nose fixing the spectacles (10).

The present invention being sufficiently described, in collaboration with the annexed figures, it is easy to understand that any detail modifications which are deemed being convenient, may be introduced therein provided that no detail modifications are introduced which alter the essence of the invention that is being summarised in the following claims.

The invention claimed is:

1. Armless spectacles of the type formed by two optics linked by a bridge, wherein the spectacles have their support on the nose of the user and are fixed to the same without the bridge bending, characterised in that:
   all the parts of the spectacles (10) are included in at least one single piece cut out in a sheet of prefabricated continuous material; and
   wherein said spectacles comprise:
   at least two areas with optical properties (11);
   a bridge area (13) inflexible in the same plane of the sheet, and
   a least two fixing plates (12) linked to the optical properties areas (11) by the linking and joint area (14),
   in that said at least single cut out sheet of continuous material is configured to form bending areas at which the sheet is bent, in at least the linking and joint areas (14), exercising the required pressure on the plates (12) for the fixing at the support points of the user.

2. Armless spectacles according to claim 1, characterised in that the optical properties area (11) is formed by a plastic material or another type that can accommodate the optical properties required by the design.

3. Armless spectacles according to claim 2, characterised in that the plates (12) are formed by protuberances that project transversely from the optical properties area (11), or another appropriate part of the spectacles (10).

4. Armless spectacles according to claim 2, characterised in that the plates (12) may be supported in their placing through projections or tabs (17), each one of said projections or tabs (17) formed by a protuberance that exits from the plate (12) in the same direction but in opposite sense.

5. Armless spectacles according to claim 2, characterised in that the plates (12) have linked to their opposite side with respect to the plane forming the optical properties area (11) a spring surface (19) which is configured as an arc remaining placed outside of said spectacles (10), such that said spring surface (19) constitutes the additional bending area which, being linked to the plates (12) through the tabs (17) tending to separate these latter ones, helps to produce the required pressure for the fixing on the support point of the user.

6. Armless spectacles according to claim 2, characterised in that, starting from an initial arrangement wherein the bridge (13) does not have its final configuration, when fixing the definitive position of the optical planes (11) modifying the bridge (13) by known methods like folding, superposition, and so forth, the spring surface (19) is forced to bend shaping like an arc that constitutes a spring.

7. Armless spectacles according to claim 2, characterised in that the folding lines (20) or cleaving lines (21) are shaped by deformations made by a process of heat shaping, pressing, bending or moulding, maintaining the relative angle of the optical elements.

8. Armless spectacles according to claim 2, characterised in that alternatively said spectacles (10) may be built from two independent filter sheets (15-16), linked by common methods.

* * * * *